United States Patent [19]

Anderson et al.

[11] 4,376,297
[45] Mar. 8, 1983

[54] VIRTUAL MEMORY ADDRESSING DEVICE

[75] Inventors: Jared A. Anderson, Woodside; Robert V. Van Gelder, Berkeley; Lauren F. Yazolino, Oakland; Jimmy E. Braun, Orange, all of Calif.

[73] Assignee: Signetics Corporation, Sunnyvale, Calif.

[21] Appl. No.: 155,694

[22] Filed: Jun. 2, 1980

Related U.S. Application Data

[62] Division of Ser. No. 894,925, Apr. 10, 1978, abandoned.

[51] Int. Cl.³ .............................................. G06F 9/32
[52] U.S. Cl. .............................................. 364/200
[58] Field of Search ... 364/200 MS File, 900 MS File

[56] References Cited

U.S. PATENT DOCUMENTS

| | | | |
|---|---|---|---|
| 3,693,165 | 9/1972 | Reiley | 364/200 |
| 3,825,904 | 7/1974 | Burk | 364/200 |
| 3,829,840 | 8/1974 | Burk | 364/200 |
| 3,902,164 | 8/1974 | Kelley | 364/200 |
| 4,053,948 | 10/1977 | Hogan | 364/200 |
| 4,057,848 | 11/1977 | Hayasai | 364/200 |
| 4,068,303 | 1/1978 | Morita | 364/200 |
| 4,145,738 | 3/1979 | Inoue | 364/200 |

*Primary Examiner*—Harvey E. Springborn
*Attorney, Agent, or Firm*—Allegretti, Newitt, Witcoff & McAndrews, Ltd.

[57] ABSTRACT

A dynamic address translation unit for converting virtual or "logical" address values into real or "physical" address values. A translation Lookaside Buffer (TLB) stores physical addresses corresponding to a limited number of previously translated logical addresses. The available space in the TLB is divided into partitions, each of which stores address translation data for a particular user process. The TLB partition in current use is identified by the value stored in a user partition counter, which is also used to verify that certain process control information (stored in a stack memory location) associated with the partition matches the process control information for that user process which is currently in control of the central processing unit.

1 Claim, 1 Drawing Figure

VIRTUAL MEMORY ADDRESSING DEVICE

CROSS-REFERENCE TO RELATED APPLICATIONS

This patent application is a divisional of the following U.S. patent application:
Title: Central Processing Unit
Inventors: Jared E. Anderson, et al.
Ser. No. 894,925, now abandoned
Filed: Apr. 10, 1978.

BRIEF SUMMARY OF THE INVENTION

This invention relates to electronic data processing systems and more particularly to a dynamic address translation unit employed in such systems to implement virtual memory operations.

"Virtual memory" allows a computer having limited main memory capacity to be programmed as if a much larger memory address space were available. Before the execution of a user's process, his programs and data are loaded into a disc or drum memory (called a "backing store"). Information in the backing store is subdivided into "segments" and each segment is further subdivided into "pages". Pages of instructions and data are then moved from the backing store into the main memory as needed by the executing process. As pages are stored in main memory, their real addresses are entered into a system of directories. Using these directories, the programmer-written virtual (or "logical") addresses are converted into real (or "physical") addresses before each memory fetch or store operation.

The virtual memory environment is typically implemented by operating system programs which utilize special hardware facilities; most notably a dynamic address translation (DAT) unit which converts virtual memory addresses into real memory addresses when the target data is present in main memory and issues an interrupt when the target data is not present.

In accordance with the present invention, virtual addresses are translated into real addresses by storing a limited number of real addresses (which correspond to previously translated logical addresses) in a partitioned Translation Lookaside Buffer (TLB) in which each partition is associated with a recently active user process. When the central processor returns control to a previously active user process, means are employed for first searching for and then verifying the validity of prior address translation data stored in that TLB partition associated with the reactivated process.

DESCRIPTION OF THE DRAWING

These and other features of the present invention will become more apparent through a consideration of the following detailed description and the attached drawings in which.

Figure 1:
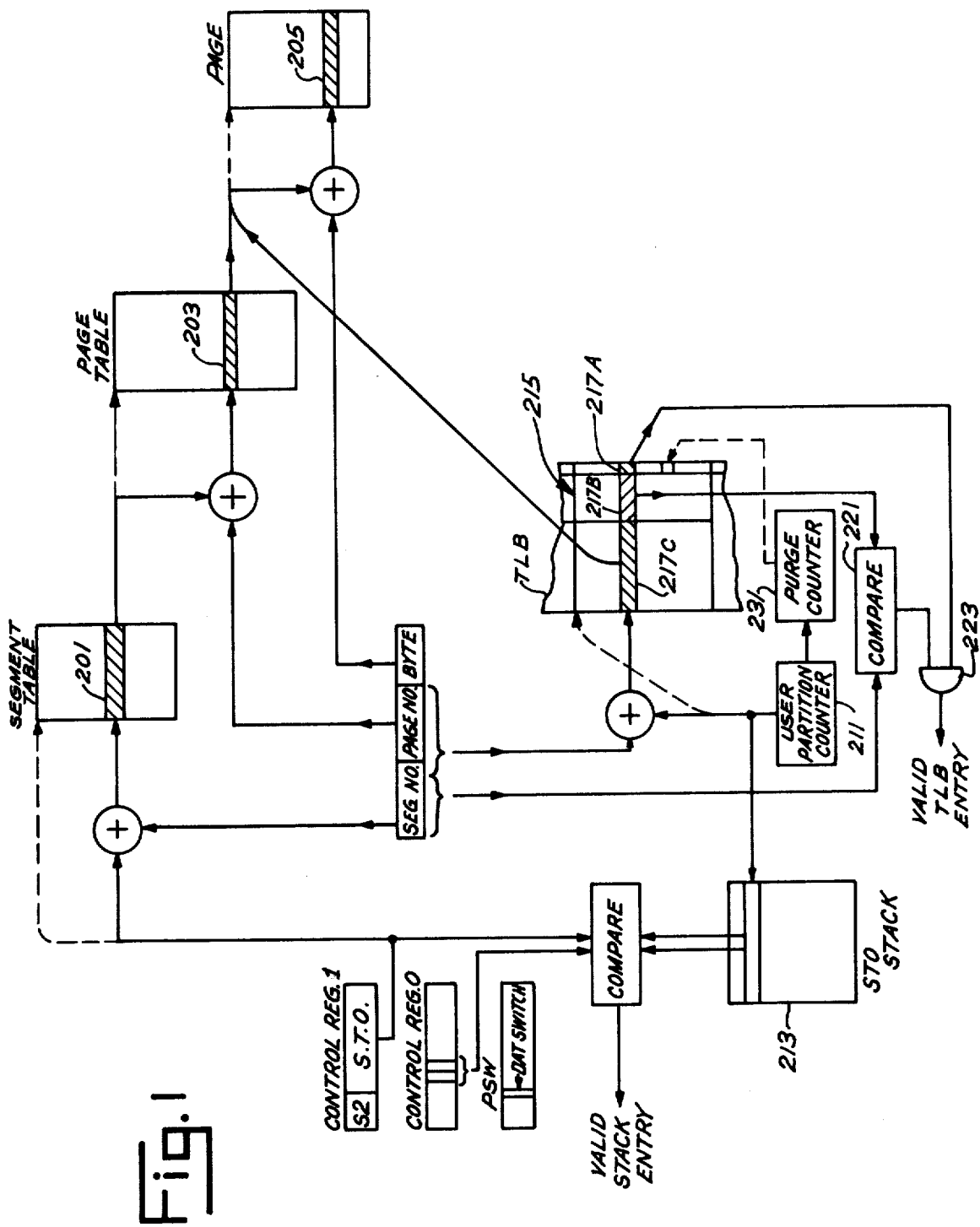
FIG. 1 is a block diagram which depicts the principle features of a dynamic address translation unit employed to implement virtual memory operations in accordance with the invention.

The dynamic address translation unit to be described is capable of implementing the virtual memory environment employed in the IBM System/370 family of processors. For a complete description of the attributes of the System/370 instruction set, the reader should consult *IBM System/370 Principles of Operation*, Form GA22-7000, IBM Corporation. In particular, with respect to virtual memory operations, attention should be directed to the Extended Control (EC) mode used in those models of the System/370 which employ virtual memory operations and to the format and content of the programmer-visible EC-mode PSW (Program Status Word) register and those control registers which form an extension of the PSW in the EC mode. For present purposes, the process control information associated with the process currently active in the CPU is illustrated by the PSW register and Control Registers 0 and 1 shown at the left in FIG. 1.

Information utilized in carrying out virtual memory operations includes the DAT switch bit (located at bit position 5 in the EC mode PSW), two bits indicating whether the page size is 2K or 4K (bit positions 8 and 9 in control register 0), two bits indicating whether the segment size is 64K or 1 M (bit positions 10 and and 11 in control register zero), bits 0-7 in control register 1 which indicate the length of the segment table in units of 64 bytes (used as a check), and bits 8-31 of control register 1 which contain the beginning address of the segment table (called the "segment table origin" or "STO").

As depicted in FIG. 1, a logical address as written by the programmer is divided into three parts: a segment number, a page number and a displacement.

The procedure for translating a logical or virtual address into a real address comprises a two-level table lookup operation carried out by the DAT unit hardware. First, the segment table origin in control register 1 is added to the segment number to yield the real address in main memory of a segment table entry indicated at 201 in FIG. 15. The segment table entry 201 contains the address of the origin of a page table. This page table origin address is then added to the page number portion of the logical address to yield the main memory address of the page table entry 203 shown in FIG. 15.

Page table entry 203 contains the real address of origin of that page containing the target data. Thus entry 203 is fetched from memory and added to the displacement portion of the logical address to yield the real address of the target data at 205.

In addition to addresses, the segment and page table entries also include flag bits which are set whenever a target segment or page is not present in main memory. If a table entry fetched from memory indicates that the target data is not present, an interrupt is issued to call memory management operating system routines.

It should be emphasized here that the double-fetch, table lookup address translation mechanism is a hardware function carried out automatically by the DAT unit whenever memory fetch and store operations are carried out unless the real address for a given logical address is already present in the Translation Lookaside Buffer (TLB), to be discussed. This address translation process executed by the DAT unit hardware is only a small part of the virtual memory management function. It is the responsibility of resident operating system programs to control the swapping of data between main memory and the backing store and to maintain the necessary information structures, including the segment and page tables.

Operating system strategies for allocating real storage and virtual storage can differ significantly. For example, in the IBM OS/VS1 environment, segment and page tables are established at the time of system initialization and thereafter the page tables are modified during system operation to reflect the allocation of main storage space to virtual storage space. In the OS/VS2 environment, only the segment table is created during initial program load (IPL). Thereafter the segment table is modified, and page tables are created and deleted as required as both virtual and real storage are dynamically allocated and deallocated.

Such operating system memory management programs make use of a number of privileged instructions within the Universal Instruction Set which effect the operation of the address translation hardware. Instructions related to virtual memory operations include the LRA (load real address), PTLB (purge translation lookaside buffer), LCTL (load control), and RRB (reset reference bit) instructions. In order to understand the nature of these instructions, however, it is necessary to consider the makeup of the DAT unit in still further detail.

As discussed above, address translation requires two memory fetch operations to be carried out in order to compute the address of the target data which must then be fetched (or stored) in a third memory access. This three to one degradation may be largely eliminated through the use of special, high speed, directly addressable store, the Translation Lookaside Buffer or TLB. The TLB stores a limited number of real addresses previously computed during prior memory accesses and makes them immediately available to permit the normal address translation procedure to be bypassed.

In accordance with a feature of the present invention the Translation Lookaside Buffer takes the form of a partitioned random access memory (RAM) which is addressed by the combination of a user partition number and the low-order bits of segment number/page number portion of the logical (incoming) address.

Logical addresses, like real addresses, are 24 bits long. If the page size is 2K (as indicated by the page size bits in control register 0), the byte displacement portion of the logical address is 11 bits long. The displacement portion of the real and virtual addresses are always identical, meaning that the 11 low order bits of a real address need not be stored in the TLB. Only the 13 high order bits need to be stored. In addition, it should be born in mind that a single TLB entry includes all the information needed to bypass the address translation process for an entire page (2K) of address space.

If a TLB size of 1024 (1K) entries is selected, and is partitioned into 8 regions of 128 TLB entries each, seven bits are required to address a given entry within a partition and three bits are required to identify the particular partition.

In accordance with a further feature of the invention, the three bit partition number is stored in a user partition counter seen at 211 in FIG. 1. This counter also addresses an 8-level segment table origin stack (STO-stack) seen at 213.

The STO-stack 213 is used to retain the segment table orgin (from control register 1) and the segment table and page table size data (from control register 0) whenever a user process having different memory mapping directories assumes control of the processor. Before considering the function of the STO-stack 213 in more detail, however, consideration will first be given to the operation of the TLB within a single user partition.

A single 128 position TLB partition is indicated generally in FIG. 1 at 215 and an individual TLB entry within that partition is indicated at 217. The address of each TLB entry is made up of three high order bits (the partition number) from user partition counter 211 and a seven-bit displacement which is made up of the two low order bits of the segment number plus the five-bit page number of the logical address.

In a memory access machine cycle, the address translation procedure involving the fetching of directory tables commences simultaneously with an attempt to determine if the needed real address is already stored in the TLB.

Because the six high-order bits of the segment number portion of the incoming logical address are not used to address the TLB, these six bits are compared with a six-bit field of the TLB entry indicated at 217B. This six-bit field contains the six high-order bits of the prior logical address whose corresponding real address was computed earlier and stored at 217B. If these two six-bit fields match, as determined by a comparator shown at 221, the real address at 217C is known to be the desired address provided that the validity bit 217A (to be discussed) is set to issue a valid TLB entry signal from gate 223. The issuance of a valid TLB entry signal causes the high order real address bits from 217C to be combined with the 11-bit logical address displacement to immediately form the desired 24-bit address of the target data at 205 and aborts the more time-consuming multiple-fetch address translation process.

When any virtual memory access takes place, an attempt is made to avoid address translation by locating a valid TLB entry. If none exists, the segment and page tables are fetched, the real address is computed and its thirteen high-order bits are placed in the TLB at a location determined by the value held in the user partition counter 211 and the seven low-order bits of the segment number/page number portion of the logical address. At the same time, the six high-order bits of the logical address are stored in the TLB entry and the validity bit is set.

When a user process is first started, its TLB partition will contain no valid entries. As each page used by the process is accessed for the first time, a TLB entry is made for it, and future references to that page may bypass address translation. Because 128 entries are available in each partition, and because each such entry contains the information needed to directly form the real addresses for a page of 2K bytes, a single TLB partition can provide direct mapping of a 256K byte address space for each of the eight user processes.

From the standpoint of the DAT hardware, a "new user process" is created whenever a LCTL (load control) instruction is executed to alter the contents of control register 0 or of control register 1. If the execution of a LCTL instruction causes the segment size, page size, or segment table origin values to be altered in any way, the address translation process will access a different set of directories and prior TLB entries will not correctly relate logical addresses in the new process to the correct real addresses, even though comparator 221 may indicate a matched condition. For this reason, the validity bit is used to prevent invalid bypassing of address translation.

If the TLB was not partitioned, the entire TLB would be rendered useless each time the segment table origin, segment size, or page size was altered. In addition, it would be necessary to delay processing until the entire TLB could be purged by posting an invalid flag in the validity bit position of all TLB entries.

In accordance with a feature of the present invention, these difficulties are avoided by means of the user partition counter 211 working in combination with the partitioned TLB and the STO-stack 213. Each time a change occurs in either the segment table origin address, the page size or the segment size, the user partition counter is cycled to search the STO-stack entries in sequence. Each STO-stack entry contains the page size, segment size and STO address of a previously executed user process. If a match is found, the counter 211 stops, leaving it pointing to the correct TLB partition. If no match is found, the counter 211 stops pointing to the oldest STO-stack entry. The value in counter 211 is then loaded into the high-order bit positions of a purge counter 231 which is cycled through 128 increments to place invalid flags in the validity bit position of each of the 128 TLB entries within the purged partition.

Partition purging thus occurs on a first-in first-out (FIFO) basis. Although it might be thought than an increase in efficiency could be obtained by using a "least recently used" replacement algorithm, the small improvement which might be gained is not believed to justify the necessary increase in hardware and processing complexity.

It is to be understood that the specific embodiment of the invention which has been described is merely illustrative of one application of the principles of the invention. Numerous modifications may be made to the preferred embodiment which has been disclosed without departing from the true spirit and scope of the invention.

What is claimed is:

1. In a computing system of the class adapted for virtual memory operation and including a main memory for storing data and instructions at locations specified by physical address values, a central processor for executing a plurality of user programs, each of said user programs including instructions in which main memory locations are specified by logical address values, control storage means in said central processor for storing a directory table origin value which specifies the main memory location of a directory table information structure which relates the logical address values of the currently executing user program to correspondence physical address values, and a dynamic address translation unit for converting said logical address values into physical address values by means of a look up operation employing said directory table information structure, an improved arrangement for bypassing said table look up operation for a limited number of previously translated logical address values which comprises, in combination:

a user partition storage register;

an origin value stack memory for storing origin values associated with user programs previously executed by said central processor, each of said origin values being stored in said origin value stack memory at a location specified by a pointer value stored in said partition storage register;

means responsive to a change in the contents of said control storage means for varying said pointer value to search said stack memory for a previously stored origin value equivalent to the origin value currently resident in said control storage means;

means for indicating a valid pointer value upon the successful completion of said search, a translation lookaside buffer memory composed of a directly addressable random access memory for storing physical address values corresponding to previously translated logical address values at locations specified by a buffer address; and means for forming said buffer address from the combination of at least a selected portion of the logical address value to be translated and said valid pointer value to access a selected one of said physical address values.

* * * * *